Feb. 1, 1927.

J. L. WHEELER 1,616,244

SHUTTER SILENCER

Filed Feb. 3, 1921   3 Sheets-Sheet 1

Inventor:
John L. Wheeler:
By Elliott Thumma
Attorneys.

Feb. 1, 1927.

J. L. WHEELER

SHUTTER SILENCER

Filed Feb. 3, 1921

Inventor:
John L. Wheeler
By Elliott & Newman
Attorneys.

Feb. 1, 1927.
J. L. WHEELER
1,616,244
SHUTTER SILENCER
Filed Feb. 3, 1921
3 Sheets-Sheet 3
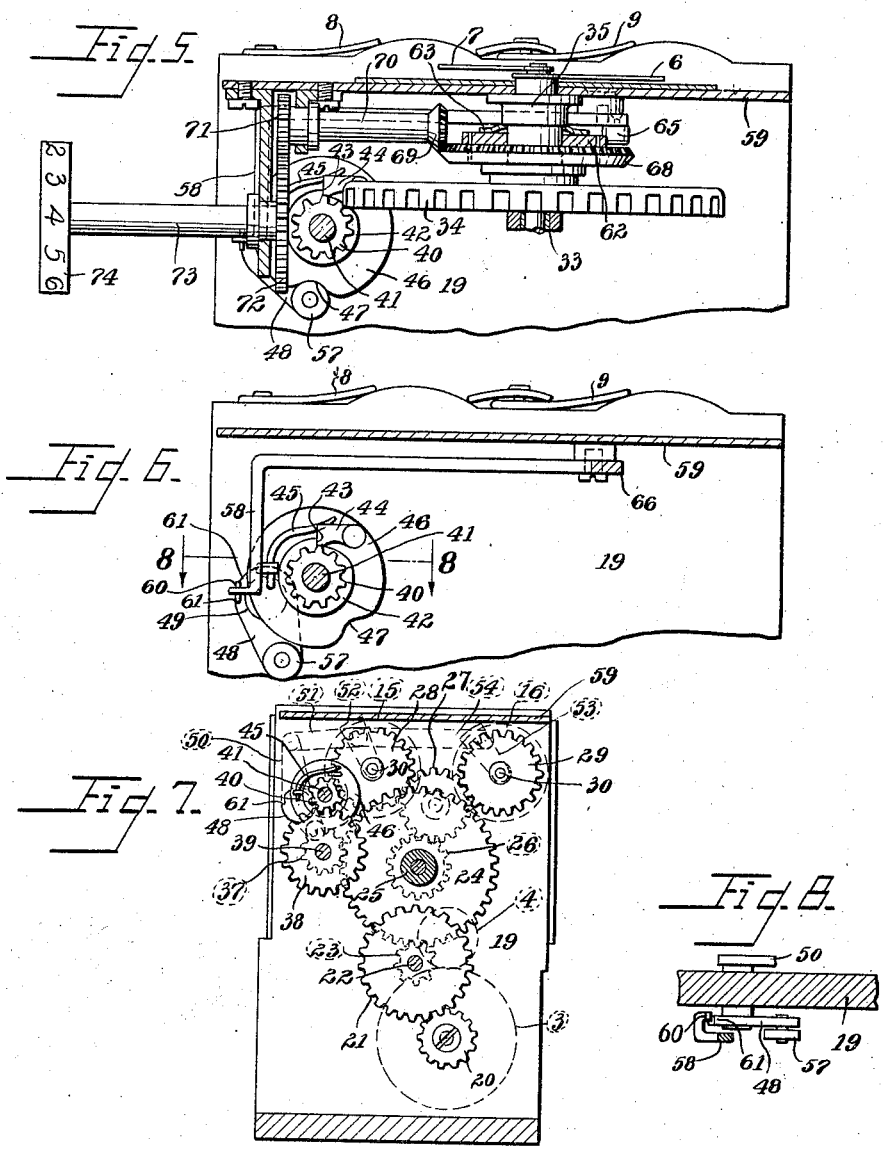
Inventor:
John L. Wheeler.
By
Attorneys

Patented Feb. 1, 1927.

1,616,244

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

SHUTTER SILENCER.

Application filed February 3, 1921. Serial No. 442,053.

This invention relates to registering or measuring machines and particularly to machines of the computing type which usually embody in their construction a driven chart bearing computed numbers indicating the cost of the measured article at different prices per yard, or other unit of measure. In the machine illustrated the length indicator is constructed to indicate aliquot fractions of the unit of measure and the chart bears computations corresponding to each number and fraction shown by the dial and corresponding to different prices per yard indicated by a fixed scale which co-operates with the chart. On the chart the computed figures are considerably condensed and hence a number on the chart can sometimes be read when the pointers are not indicating exactly the length to which the visible computed figure corresponds. For this reason a shutter has been resorted to which operates as a screen to cover the chart, and this shutter is withdrawn automatically whenever the fraction pointer is coinciding with one of the numbered aliquot divisions of the unit indicated on the scale of the length indicator. The result of this is that with such a mechanism the shutter opens and closes repeatedly as every eighth yard is measured, and this will occur even if a considerable length of goods is to be measured.

The general object of the present invention is not only to provide a shutter to perform the function suggested above, but to provide controlling means for the shutter which will operate in such a way that the shutter will not commence to open and close until a predetermined point has been reached in taking the measurement; for example, suppose that it were desired to measure 8¼ yards; my invention enables me to set the controlling mechanism so that the shutter will remain closed until about 8 yards have been indicated, at which time the shutter will commence to operate in the regular manner.

Further objects of the invention will appear hereinafter.

The invention consists in the novel features, and in the general combination of parts to be particularly described hereinafter, all of which contribute to produce a simple and efficient shutter silencer for measuring and computing machines. A preferred embodiment of my invention will be particularly described in the following specification, while the broad scope of my invention will be pointed out in the appended claims.

In the drawing,

Figure 5 is a vertical section taken about on the line 5—5 of Figure 3 but upon an enlarged scale, the casing being omitted;

Figure 6 is a sectional view taken near the plane of the line 4—4 of Figure 3 and particularly illustrating the means for controlling the operation of the shutter actuating mechanism;

Figure 7 is a vertical cross section taken about in the plane of the line 4—4 of Figure 3 and particularly illustrating the driving mechanism for driving the charts and the indicating pointers; and Figure 8 is a horizontal section taken about on the level of the line 8—8 in Figure 6 and further illustrating details of the trigger which controls the operation of the shutter actuating mechanism.

Figure 1:
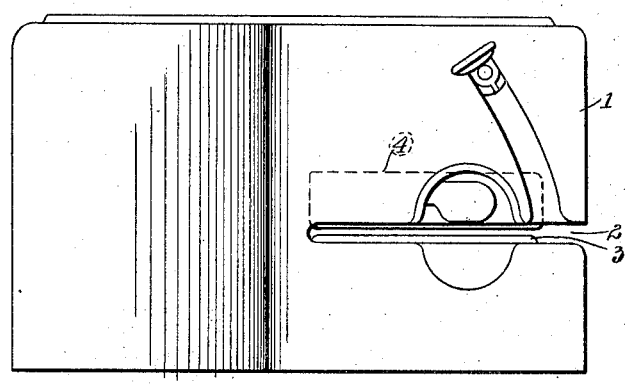
Figure 1 is a side elevation of a type of machine to which my invention may be applied.
Figure 2:
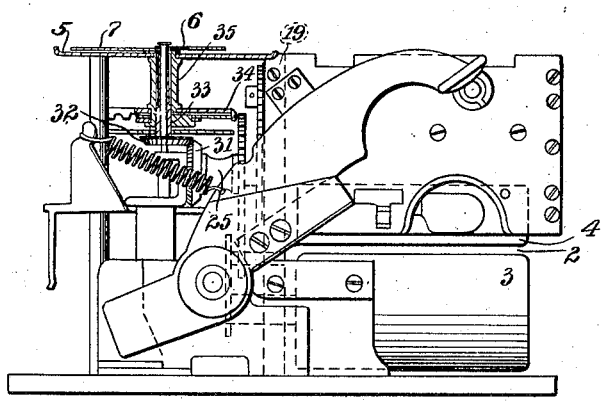
Figure 2 is a view showing a side elevation of the mechanism of this machine with the casing removed, a part of the driving mechanism being shown in section. In this view certain parts are omitted for the sake of clearness.
Figure 3:
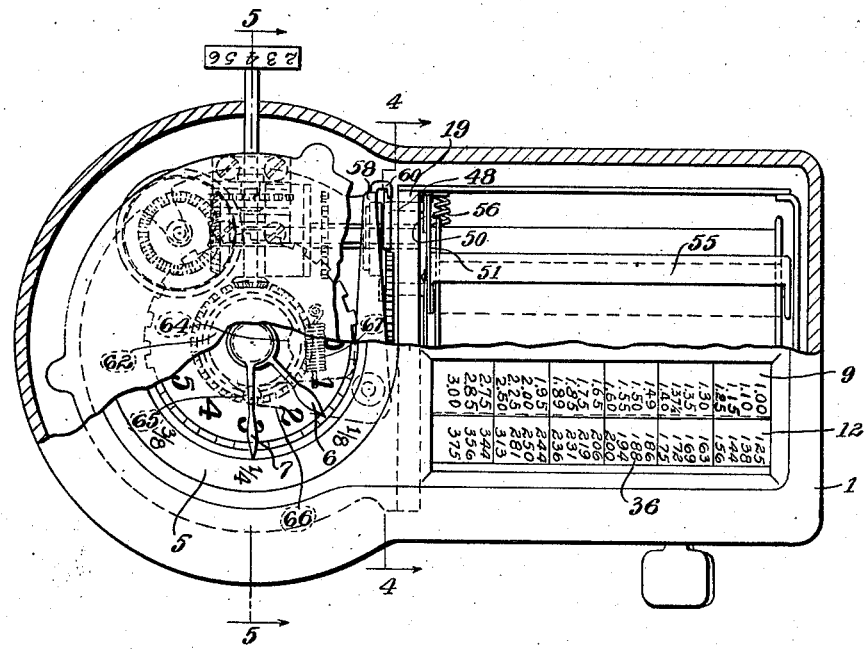
Figure 3 is a plan of the complete machine partially broken away and shown in cross section.

The machine to which I have illustrated the invention as applied comprises a casing 1 having a gap 2 through the same and in this gap is located a measuring roller 3 (see Figure 2). With this measuring roller a presser roller 4 co-operates to press the fabric against the face of the measuring roller when a measurement is being taken. The indicating mechanism includes a length indicator comprising a dial 5 (see Figure 3) having numbers which indicate multiples of the unit of measure, for example yards, and this dial also carries fractional divisions corresponding to aliquot divisions of the unit of measure, for example eighths of a yard. Above the scale two hands or pointers 6 and 7 are provided, the latter of which makes one complete revolution while the pointer 6 is moving from one division to the next, for example between the numbers 1 and 2 on the dial.

Figure 4:
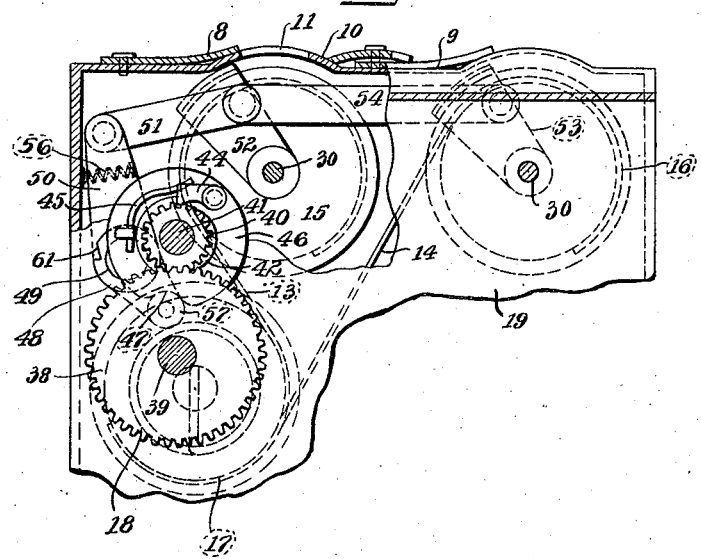
Figure 4 is a section taken about on the line 4—4 of Figure 3, but with certain parts broken away, and the casing of the machine being omitted; this view particularly illustrates the shutter and its actuating mechanism.

The indicating mechanism also includes means for indicating the charges to be made for the fabric, computed at different prices per yard. This mechanism includes two fixed scales 8 and 9 (see Figures 3 and 4) adjacent to which the upper frame plate 10 of the machine is provided with windows such as the window 11 through which the computed figures may be seen; and the casing 1 is provided with windows 12 alining with the windows 11 (see Figure 3). Two charts 13 and 14 are provided which wrap around take-up rollers 15 and 16, and when the indicating mechanism is in its zero position the principal portion of these charts is wrapped about a drum 17 disposed below the take-up rollers and to one side (see Figure 4). This drum 17 carries within it a spring 18 which maintains the charts in tension and returns the mechanism to the zero position.

Any suitable means may be provided for driving the charts 13 and 14 and the indicating pointers 6 and 7 in unison. For this purpose the shaft of the measuring roller 3 extends through a vertical frame plate 19 (see Figure 7) and carries a pinion 20 which drives a gear wheel 21 on the shaft 22, said shaft carrying a pinion 23 which drives a large gear wheel 24 carried by a sleeve 25, and rigid with this gear wheel 24 I provide a pinion 26 which drives an idler 27 which meshes with two gears 28 and 29 which are carried respectively by the shafts 30 of the two take-up rollers 15 and 16. A clutch, not illustrated, is usually provided on the shaft 22.

The pointers 6 and 7 are driven in unison with the charts 13 and 14. For this purpose the sleeve 25 carries a bevel gear 31 (see Figure 2) which meshes with a bevel gear 32 on the lower end of a tubular shaft 33, the upper end of which carries the fraction pointer 7. A reduction gear 34 is provided of any suitable construction from which a sleeve 35 extends upwardly, the upper end of which carries rigidly the slow moving pointer 6. This sleeve 35 operates as the driving spindle for this pointer 6.

The charts 13 and 14 carry rows of computed Figures 36 (see Figure 3) which are in line respectively with rows of figures on the scales 8 and 9 which indicate different prices per yard or other unit of measure. In other words, the computed figures at 36 are functions of the length indicated by the pointers 6 and 7. There is a computed figure on each chart corresponding to each eighth of a yard of measurement which can be indicated by the hands 6 and 7. But there are no computations for intermediate positions of the hand or pointers 7. Hence it may happen that a computed figure would be visible through the window 12 when the hand or pointer 7 is in an intermediate position, and hence the computed figure would not indicate the proper price for the measurement indicated. For this reason machines of this type have been provided with means for preventing the reading of the chart except when the pointers indicate the measurement corresponding to the computed figure displayed at the window. The specific means for this purpose consists of a shutter which screens the chart or charts in all intermediate positions of the pointer 7, but which opens automatically when the pointer 7 is opposite one of the fractional divisions, for example, the one-eighth division or the one-fourth division, etc.

In making short measurements there is no objection to the repeated opening and closing of the shutter, but in making long measurements it is desirable to avoid this unnecessary movement of the shutter mechanism. I shall now describe the shutter and the shutter actuating mechanism after which I shall describe means for inhibiting the operation of the shutter until the length indicator arrives at a predetermined point. When this point is reached the shutter operates in its regular automatic manner.

Referring to Figure 7 the large gear wheel 24 drives a pinion 37 which is rigid with a larger gear wheel 38 mounted on a counter shaft 39. And the larger gear wheel 38 drives a pinion 40 just above it and which is loose on a shaft 41. Rigid with the pinion 40 there is provided a ratchet 42 having a shoulder 43 which engages a pawl 44 pressed by a spring 45 and carried on a pawl carrier 46 in the form of a cam and having a cam notch or depression 47. Co-operating with the cam 46 I provide a cam lever 48 the shaft 49 of which extends through the aforesaid vertical frame plate 19 and carries a lever 50 on the other side of the frame plate (see Figure 4.) This lever is connected by a link 51 with a shutter 52 which is pivotally mounted on the shaft 30 of the roller 15. A similar shutter 53 is provided corresponding to the roller 16, and the two shutters are connected by a link 54. Each shutter has a longitudinally extending bar 55 (see Figure 3) which may come into position under the window 11 and thereby screen the face of the chart so that it cannot be seen by the person operating the machine. A spring 56 attached to the lever 50 tends to hold the cam roller 57 of the lever 48 against the edge of the cam 46. With a shutter actuating mechanism constructed as described, it is evident that when the pinion 40 is driven in a clockwise direction it will rotate the cam 46 continuously and open the shutter once in each cycle or complete rotation of the cam.

I provide means for "silencing" or inhibiting the operation of the shutter. This is preferably accomplished by means of a trigger 58 which is in the form of a bent bellcrank lever mounted under frame plate 59 (see Figure 6), and this trigger terminates in a horizontally extending finger 60 which projects toward the face of the frame plate 19 and in a position to engage a shoulder 61 cut in the periphery of cam lever 48. The function of the finger is to hold the cam lever away from the cam and in the position indicated in Figure 6. In this connection it should be understood that the presence of the finger 60 abutting against the shoulder 61 prevents an anti-clockwise rotation of lever 48 on its pivot 49 thereby holding the spring 56 extended. However, when a predetermined point in the measuring movement has been reached, this trigger is actuated automatically to withdraw the finger 60 and this permits the spring 56 to open the shutters and simultaneously pulls cam lever 48 over so that its roller 57 comes in contact with the edge of the cam. At each revolution, when the notch 47 comes opposite to the roller 57, the roller moves into the notch, thereby permitting the spring to open the shutter again. It should be understood that this cam rotates in synchrony with the fraction pointer 7, so that whenever the pointer 7 arrives at one of the fractional divisions of the scale the cam will permit the spring 56 to open the shutter.

I shall now describe the controlling means for controlling the trigger 58 and the means for setting it to any predetermined position at will. On the spindle 35 I provide a controller member in the form of a cam 62 (see Figure 5) and this cam is driven by a friction drive from the spindle 35. This friction drive may be accomplished by means of a spring washer 63 which thrusts against a shoulder on the spindle 35, the edge of the disk or washer engaging the upper face of the cam. This cam has a notch 64 or other means on its periphery which engages a friction roller 65 carried on an arm 66 of the trigger or bell crank lever 58. Beneath the plate 59 a spring 67 is provided which is attached to the arm 66 and operates to hold the roller 65 against the edge of the controller cam 62. (See Fig. 3).

The details of the construction of the trigger are clearly illustrated in Figure 8 from which it will be evident that when the finger moves toward the plate 19 it will move out of engagement with the shoulder 61. This will release the cam lever and permit the shutter actuating mechanism to operate the shutter. In order to enable the controller cam 62 to be set in an advanced position, when the pointers 6 and 7 are at zero I provide the controller cam 62 with a rigid bevel gear wheel 68 which may be rotated by a small bevel pinion 69 (see Figure 5) carried on a horizontal spindle 70 which carries a pinion 71 meshing with a gear wheel 72 rotatably mounted on a stem 73 carrying a hand wheel 74. This hand wheel 74 has numbered divisions which are numbered from 1 to 12 to correspond with the large numbers on the dial. The number which is uppermost on the hand wheel will indicate the point at which the shutter will commence to operate. With this construction it will be evident that if the hands 6 and 7 are at zero the hand wheel 74 may be rotated so as to move the notch 64 in a backward or anti-clockwise direction on the spindle 35. As the pointer 6 rotates, the cam 62 and its notch 64 rotate with the pointer, and when the notch gets under the roller on the end of the arm 66 of the bell-crank lever 58 it will permit the spring 67 to actuate the trigger or bell-crank lever 58 in the proper direction to release the lever 48. This will enable the shutter to commence operating.

I will now briefly describe the general mode of operation of the entire mechanism. In the measuring operation the fabric is pulled through the gap 2 between the measuring roller 3 and the presser roller 4 thereby rotating the pinion 20 carried by the measuring roller shaft (see Figure 7) and this communicates movement through the gear train 21, 24, 27, etc. to the gears 28 and 29 which are rigid with the take-up rollers 15 and 16. This rotates the take-up rollers in a clockwise direction and winds up the charts 13 and 14 upon them. Through the bevel gears 31 and the reduction gear 34 the hands 6 and 7 are rotated in unison with the charts. The shutters 52 and 53 are normally held under the windows 11 thereby operating to screen the charts. They are held in this position by the finger 60 carried by trigger 58 which engages shoulder 61 and holds the cam lever 48 in the position to hold the shutters closed. By rotating the hand wheel 74 the controlling cam 62 may be set around so as to place its notch 64 in any position desired. This cam 62 rotating as it does with the spindle 35 of the yard pointer 6 finally moves to a point where the notch 64 will permit the trigger or bell crank lever 58 to swing in a direction to disengage the finger 60 from the cam lever. This will release the cam lever and permit its roller 57 to come against the edge of cam 46. The edge of the cam 46 normally holds the shutter closed, but as the pointer 7 passes each fractional division such as the one-eighth, or one-fourth division, etc. the shutter will open automatically thereby enabling the computed figures 36 on the chart to be read. In this way the shutter is so controlled that it only commences to operate at about the time when its operation is needed.

It is understood that the embodiment of the invention described herein is only one of the many embodiments my invention may take, and I do not wish to be limited in the practice of my invention nor in my claims, to the particular embodiment set forth.

What I claim is:

1. In a measuring machine, the combination of a length-indicator and a chart bearing computed figures, means for moving the length indicator and chart in harmony, shutter means co-operating with the chart, automatic shutter operating means for causing the shutter-means to screen the chart between certain predetermined indicating positions of the length-indicator and to display it at such positions, and means for controlling the shutter operating means to inhibit the opening of the shutter means thereby until the length-indicator indicates a predetermined length.

2. In a measuring machine, the combination of a measuring roller, a length-indicator comprising a scale with fractional divisions of the unit of measure, a pointer cooperating therewith, a chart bearing computed figures based on different prices per yard of the unit of measure and the said fractions thereof, means for driving the pointer and the chart from the measuring roller, shutter means cooperating with the chart, means for controlling the same to prevent the chart from being seen except when the pointer is in substantial alinement with one of the said fractional divisions on the scale, and functioning automatically at such time to open the shutter, and means for controlling the shutter controlling means to inhibit the opening of the shutter until the length-indicator indicates a predetermined length.

3. In a measuring machine, the combination of a measuring roller, a length-indicator having a driven pointer and a scale with fractional divisions corresponding to aliquot fractions of the unit of measure, a chart driven in unison with the pointer, and bearing computed figures corresponding to multiples of the unit of measure and said aliquot fractions thereof, a shutter cooperating with the chart, means for driving the pointer and the chart from the measuring roller, shutter-actuating mechanism for the shutter operating when actuated to hold the shutter open when the pointer substantially alines with one of the fractional divisions of the scale and operating to hold the shutter closed when the pointer is in other positions, a controller member mounted to rotate with the pointer, a trigger controlled thereby for inhibiting the operating of the said shutter-actuating mechanism, means for setting said controller member in a predetermined position at will, said controller member having means for actuating the trigger and thereby putting the actuating mechanism of the shutter in operation.

4. In a measuring machine, the combination of a measuring roller, a length-indicator driven thereby and having a driven pointer and a scale with fractional divisions corresponding to aliquot fractions of the unit of measure, a chart driven in unison with the pointer, and bearing computed figures corresponding to multiples of the unit of measure and said aliquot fractions thereof, a shutter co-operating with the chart, shutter-actuating mechanism comprising a cam mounted so as to be driven in synchrony with the pointer, a cam lever adapted to be controlled by the cam and connected with the shutter for actuating the same, a controller member mounted to rotate in unison with the pointer, a trigger controlled thereby constructed to engage said lever and hold the same away from the cam, and means for setting said controller member in a predetermined position at will, said controller member operating to actuate the trigger at a predetermined point to release the cam lever and permit the shutter to operate thereafter.

5. In a measuring machine, the combination of a measuring roller, a length-indicator driven thereby and having a driven pointer and a scale with fractional divisions corresponding to aliquot fractions of the unit of measure, a chart driven in unison with the pointer, and bearing computed figures corresponding to multiples of the unit of measure and said aliquot fractions thereof, a shutter cooperating with the chart, shutter-actuating mechanism, a spindle carrying the said driven pointer, a controller member having a friction drive connection with said spindle whereby the controller member rotates in unison with the pointer, means for setting the controller member in predetermined positions at will, and a trigger constructed to prevent movement of the shutter-actuating mechanism, and actuated by the controller member to release the same and permit the shutter to operate.

6. In a measuring machine, the combination of a measuring roller, a length-indicator driven thereby, and having a driven pointer and a scale with fractional divisions corresponding to aliquot fractions of the unit of measure, a chart driven in unison with the pointer, and bearing computed figures corresponding to multiples of the unit of measure and said aliquot fractions thereof, a shutter co-operating with the chart, shutter-actuating mechanism, a spindle carrying the said driven pointer, a controller member having a friction drive connection with said spindle whereby the controller member rotates in unison with the pointer, a hand wheel having numbered divisions on its periphery and having a rotatably mounted stem, means actuated by said stem for setting the controller member in predetermined positions at will when the pointer is in its zero position, and a trigger constructed to prevent movement of the shutter-actuating mechanism, and actuated by the controller member to release the same and permit the shutter to operate when the pointer arrives at a predetermined position.

7. In a registering machine having a driven chart carrying computed figures, and a driven pointer for indicating lengths measured, the combination of a scale cooperating with the pointer and having fractional divisions corresponding to aliquot fractions of the unit of measure, a shutter, means for holding the shutter in a position to screen the chart until the pointer arrives at a predetermined point in the measuring movement, and automatic means for actuating the shutter thereafter to open the same and to hold the same open when the pointer is in substantial alinement with a fractional division of said scale immediately beyond said point.

8. In a registering machine, the combination of a unit pointer and a fraction pointer, a chart driven in unison therewith, a scale cooperating with the pointers, having numbers indicating multiples of the unit of measure and fractional divisions corresponding to aliquot fractions of the unit of measure, a cam driven in synchrony with the fraction pointer so that the cam passes through one cycle or revolution while the fraction pointer is passing from one of the fractional divisions to the next, a shutter cooperating with the chart, a cam lever connected with the shutter and adapted to be actuated by the cam to move the shutter, a trigger for engaging the cam lever to prevent the same from engaging the cam, a controller member and frictional means for driving the same in unison with the pointers, a hand wheel having numbered divisions on its periphery, means actuated thereby for rotating the controller member to set the same to any predetermined position at will when the pointers are in the zero position, said controller member having means on its periphery for actuating the trigger to release the cam lever and start the operation of the shutter at a predetermined point.

In testimony whereof, I have hereunto set my hand.

JOHN L. WHEELER.